US009706580B2

(12) United States Patent
Lee et al.

(10) Patent No.: US 9,706,580 B2
(45) Date of Patent: *Jul. 11, 2017

(54) METHOD FOR TRANSMITTING RESPONSE INFORMATION IN MOBILE COMMUNICATIONS SYSTEM

(71) Applicant: LG ELECTRONICS INC., Seoul (KR)

(72) Inventors: Young Dae Lee, Hanam-si (KR); Sung Duck Chun, Anyang-si (KR); Myung Cheul Jung, Seoul (KR); Sung Jun Park, Gunpo-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/246,087

(22) Filed: Aug. 24, 2016

(65) Prior Publication Data

US 2016/0366706 A1 Dec. 15, 2016

Related U.S. Application Data

(63) Continuation of application No. 13/874,199, filed on Apr. 30, 2013, now Pat. No. 9,462,576, which is a (Continued)

(30) Foreign Application Priority Data

Nov. 1, 2006 (KR) .................. 10-2006-0107105

(51) Int. Cl.
*H04W 74/00* (2009.01)
*H04W 74/08* (2009.01)
(Continued)

(52) U.S. Cl.
CPC ....... *H04W 74/0833* (2013.01); *H04L 1/1671* (2013.01); *H04L 1/1825* (2013.01);
(Continued)

(58) Field of Classification Search
None
See application file for complete search history.

(56) References Cited

U.S. PATENT DOCUMENTS 5,659,756 A   8/1997  Hefferon et al.
5,828,677 A   10/1998 Sayeed et al.
(Continued)

FOREIGN PATENT DOCUMENTS

CN    1104402    6/1995
CN    1315121    9/2001
(Continued)

OTHER PUBLICATIONS

Motorola, Inc., "Technical Overview of 1xEV-DV," Version: G1.4, Sep. 2002, 24 pages.
(Continued)

*Primary Examiner* — Ajay Cattungal
*Assistant Examiner* — Gautam Sharma
(74) *Attorney, Agent, or Firm* — Lee Hong Degerman Kang Waimey

(57) ABSTRACT

A method for transmitting radio resources in a mobile communication system is disclosed. The method includes receiving a random access channel (RACH) preamble from a plurality of UEs and transmitting response information associated with the received preambles over a common channel wherein the plurality UEs can access the common channel and receive corresponding information. If a HARQ scheme is used when a UE transmits data to the eNode-B using uplink radio resources allocated over the RACH, the eNode-B does not pre-allocate uplink radio resources
(Continued)

required for re-transmission and performs allocation of radio resources for a first transmission of HARQ. If the re-transmission is required, the eNode-B allocates the radio resources required for the re-transmission with the NACK signal. If re-transmission is not required, the present invention can reduce an amount of wasted radio resources.

16 Claims, 4 Drawing Sheets

Related U.S. Application Data continuation of application No. 13/410,214, filed on Mar. 1, 2012, now Pat. No. 8,451,821, which is a continuation of application No. 12/903,127, filed on Oct. 12, 2010, now Pat. No. 8,223,713, which is a continuation of application No. 12/278,566, filed as application No. PCT/KR2007/000654 on Feb. 7, 2007, now Pat. No. 7,843,877.

(60) Provisional application No. 60/771,305, filed on Feb. 7, 2006, provisional application No. 60/815,722, filed on Jun. 21, 2006.

(51) Int. Cl.
*H04L 1/16* (2006.01)
*H04L 12/801* (2013.01)
*H04W 72/04* (2009.01)
*H04L 5/00* (2006.01)
*H04L 1/18* (2006.01)
*H04W 28/26* (2009.01)
*H04W 72/12* (2009.01)
*H04W 56/00* (2009.01)

(52) U.S. Cl.
CPC .......... *H04L 1/1861* (2013.01); *H04L 1/1887* (2013.01); *H04L 5/0055* (2013.01); *H04L 47/10* (2013.01); *H04L 47/18* (2013.01); *H04L 47/34* (2013.01); *H04W 72/042* (2013.01); *H04W 72/0413* (2013.01); *H04W 74/006* (2013.01); *H04L 1/1812* (2013.01); *H04W 28/26* (2013.01); *H04W 56/0045* (2013.01); *H04W 72/12* (2013.01); *H04W 74/004* (2013.01); *H04W 74/0866* (2013.01)

(56) References Cited

U.S. PATENT DOCUMENTS

| | | | |
|---|---|---|---|
| 6,088,342 A | 7/2000 | Cheng et al. |
| 6,128,690 A | 10/2000 | Purcell et al. |
| 6,138,158 A | 10/2000 | Boyle et al. |
| 6,317,430 B1 | 11/2001 | Knisely et al. |
| 6,330,448 B1 | 12/2001 | Otsuka et al. |
| 6,381,229 B1 | 4/2002 | Narvinger et al. |
| 6,480,525 B1 | 11/2002 | Parsa et al. |
| 6,571,102 B1 | 5/2003 | Hogberg et al. |
| 6,597,668 B1 | 7/2003 | Schafer et al. |
| 6,597,675 B1 | 7/2003 | Esmailzadeh et al. |
| 6,717,925 B1 | 4/2004 | Leppisaari et al. |
| 6,728,225 B1 | 4/2004 | Ozluturk |
| 6,785,510 B2 | 8/2004 | Larsen |
| 6,791,963 B1 | 9/2004 | Hwang et al. |
| 6,795,412 B1 | 9/2004 | Lee |
| 6,850,504 B1 | 2/2005 | Cao et al. |
| 6,859,445 B1 | 2/2005 | Moon et al. |
| 6,907,015 B1 | 6/2005 | Moulsley et al. |
| 6,934,550 B2 | 8/2005 | Kearney et al. |
| 6,947,394 B1 | 9/2005 | Johansson et al. |
| 6,950,420 B2 | 9/2005 | Sarkkinen et al. |
| 6,965,580 B1 | 11/2005 | Takagi et al. |
| 7,016,343 B1 | 3/2006 | Mermel et al. |
| 7,031,708 B2 | 4/2006 | Sarkkinen et al. |
| 7,075,971 B2 | 7/2006 | Parsa et al. |
| 7,099,309 B2 | 8/2006 | Davidson |
| 7,145,895 B2 | 12/2006 | Mueckenheim et al. |
| 7,151,758 B2 | 12/2006 | Kumaki et al. |
| RE39,454 E | 1/2007 | Cantoni et al. |
| 7,184,792 B2 | 2/2007 | Mir |
| 7,239,870 B2 | 7/2007 | Zhang et al. |
| 7,359,349 B2 | 4/2008 | Kayama et al. |
| 7,376,424 B2 | 5/2008 | Kim et al. |
| 7,385,952 B2 | 6/2008 | Mantha et al. |
| 7,398,108 B2 | 7/2008 | Hondo |
| 7,430,206 B2 | 9/2008 | Terry et al. |
| 7,436,801 B1 | 10/2008 | Kanterakis |
| 7,443,816 B2 | 10/2008 | Chen et al. |
| 7,496,113 B2 | 2/2009 | Cai et al. |
| 7,590,089 B2 | 9/2009 | Park et al. |
| 7,664,059 B2 | 2/2010 | Jiang |
| 7,729,719 B2 | 6/2010 | Bergstrom et al. |
| 7,826,859 B2 | 11/2010 | Lee et al. |
| 7,839,829 B2 | 11/2010 | Lee et al. |
| 7,843,877 B2 | 11/2010 | Lee et al. |
| 7,848,308 B2 | 12/2010 | Lee et al. |
| 8,031,668 B2 | 10/2011 | Wang et al. |
| 8,036,110 B2 | 10/2011 | Ishii et al. |
| 8,068,511 B2 | 11/2011 | Reznik et al. |
| 8,090,382 B2 | 1/2012 | Park et al. |
| 8,098,644 B2 | 1/2012 | Xiao et al. |
| 2001/0024956 A1 | 9/2001 | You et al. |
| 2001/0046864 A1 | 11/2001 | Bhatoolaul et al. |
| 2002/0009067 A1 | 1/2002 | Sachs et al. |
| 2002/0009129 A1 | 1/2002 | Choi et al. |
| 2002/0021698 A1 | 2/2002 | Lee et al. |
| 2002/0021714 A1 | 2/2002 | Seguin |
| 2002/0028690 A1 | 3/2002 | McKenna et al. |
| 2002/0032884 A1 | 3/2002 | Kobata et al. |
| 2002/0044527 A1 | 4/2002 | Jiang et al. |
| 2002/0048316 A1 | 4/2002 | Imaizumi et al. |
| 2002/0071480 A1 | 6/2002 | Marjelund et al. |
| 2002/0080887 A1 | 6/2002 | Jeong et al. |
| 2002/0090004 A1 | 7/2002 | Rinchiuso |
| 2002/0093940 A1 | 7/2002 | Toskala et al. |
| 2002/0116515 A1 | 8/2002 | Hashimoto |
| 2002/0126629 A1 | 9/2002 | Jiang et al. |
| 2002/0131375 A1 | 9/2002 | Vogel et al. |
| 2002/0160744 A1 | 10/2002 | Choi et al. |
| 2002/0181436 A1 | 12/2002 | Mueckenheim et al. |
| 2002/0187789 A1 | 12/2002 | Diachina et al. |
| 2002/0191559 A1 | 12/2002 | Chen et al. |
| 2003/0003920 A1 | 1/2003 | Sebastian |
| 2003/0007510 A1 | 1/2003 | Yeo et al. |
| 2003/0016672 A1 | 1/2003 | Rosen et al. |
| 2003/0031119 A1 | 2/2003 | Kim et al. |
| 2003/0035440 A1 | 2/2003 | Casaccia et al. |
| 2003/0043741 A1 | 3/2003 | Mukai et al. |
| 2003/0050097 A1 | 3/2003 | Amirijoo et al. |
| 2003/0054829 A1 | 3/2003 | Moisio |
| 2003/0076812 A1 | 4/2003 | Benedittis |
| 2003/0078046 A1 | 4/2003 | Seo |
| 2003/0084185 A1 | 5/2003 | Pinkerton |
| 2003/0099305 A1 | 5/2003 | Yi et al. |
| 2003/0103476 A1 | 6/2003 | Choi et al. |
| 2003/0131124 A1 | 7/2003 | Yi et al. |
| 2003/0137931 A1 | 7/2003 | Hans et al. |
| 2003/0139170 A1 | 7/2003 | Heo |
| 2003/0147371 A1 | 8/2003 | Choi et al. |
| 2003/0156624 A1 | 8/2003 | Koslar |
| 2003/0223393 A1 | 12/2003 | Lee |
| 2003/0236085 A1 | 12/2003 | Ho |
| 2004/0001452 A1 | 1/2004 | Day et al. |
| 2004/0002334 A1 | 1/2004 | Lee et al. |
| 2004/0004954 A1 | 1/2004 | Terry et al. |
| 2004/0006643 A1 | 1/2004 | Dolson et al. |
| 2004/0008658 A1 | 1/2004 | Dahlman et al. |
| 2004/0008659 A1 | 1/2004 | Kim |
| 2004/0014452 A1 | 1/2004 | Lim et al. |
| 2004/0028078 A1 | 2/2004 | Beckmann et al. |
| 2004/0057387 A1 | 3/2004 | Yi et al. |

(56) References Cited

U.S. PATENT DOCUMENTS

| | | |
|---|---|---|
| 2004/0062267 A1 | 4/2004 | Minami et al. |
| 2004/0077357 A1 | 4/2004 | Nakada |
| 2004/0097192 A1 | 5/2004 | Schiff |
| 2004/0103435 A1 | 5/2004 | Yi et al. |
| 2004/0114593 A1 | 6/2004 | Dick et al. |
| 2004/0114606 A1 | 6/2004 | Haddad |
| 2004/0116143 A1 | 6/2004 | Love et al. |
| 2004/0117860 A1 | 6/2004 | Yi et al. |
| 2004/0125772 A9 | 7/2004 | Wu et al. |
| 2004/0127223 A1 | 7/2004 | Li et al. |
| 2004/0143676 A1 | 7/2004 | Baudry et al. |
| 2004/0146019 A1 | 7/2004 | Kim et al. |
| 2004/0147266 A1 | 7/2004 | Hwang et al. |
| 2004/0147271 A1 | 7/2004 | Billon et al. |
| 2004/0157602 A1 | 8/2004 | Khawand |
| 2004/0171395 A1 | 9/2004 | Shin |
| 2004/0176094 A1 | 9/2004 | Kim et al. |
| 2004/0180675 A1 | 9/2004 | Choi et al. |
| 2004/0184437 A1 | 9/2004 | Lee et al. |
| 2004/0185860 A1 | 9/2004 | Marjelund et al. |
| 2004/0196861 A1 | 10/2004 | Rinchiuso et al. |
| 2004/0198369 A1 | 10/2004 | Kwak et al. |
| 2004/0202140 A1 | 10/2004 | Kim et al. |
| 2004/0208160 A1 | 10/2004 | Petrovic et al. |
| 2004/0229626 A1 | 11/2004 | Yi et al. |
| 2004/0248600 A1 | 12/2004 | Kim |
| 2004/0264497 A1 | 12/2004 | Wang et al. |
| 2004/0264550 A1 | 12/2004 | Dabak |
| 2004/0266494 A1 | 12/2004 | Ruuska et al. |
| 2005/0008035 A1 | 1/2005 | Eklund et al. |
| 2005/0014508 A1 | 1/2005 | Moulsley et al. |
| 2005/0020260 A1 | 1/2005 | Jeong et al. |
| 2005/0025039 A1 | 2/2005 | Hwang et al. |
| 2005/0026623 A1 | 2/2005 | Fisher |
| 2005/0039101 A1 | 2/2005 | Torsner |
| 2005/0041573 A1 | 2/2005 | Eom et al. |
| 2005/0054368 A1 | 3/2005 | Amerga |
| 2005/0059407 A1 | 3/2005 | Reed et al. |
| 2005/0059421 A1 | 3/2005 | Reed et al. |
| 2005/0063336 A1 | 3/2005 | Kim et al. |
| 2005/0073987 A1 | 4/2005 | Wu |
| 2005/0105482 A1 | 5/2005 | Kobayashi et al. |
| 2005/0107036 A1 | 5/2005 | Song et al. |
| 2005/0111393 A1 | 5/2005 | Jeong et al. |
| 2005/0118947 A1 | 6/2005 | Ames et al. |
| 2005/0129058 A1 | 6/2005 | Casaccia et al. |
| 2005/0135416 A1 | 6/2005 | Ketchum et al. |
| 2005/0157696 A1 | 7/2005 | Yamamoto |
| 2005/0185608 A1 | 8/2005 | Lee et al. |
| 2005/0190728 A1 | 9/2005 | Han et al. |
| 2005/0195732 A1 | 9/2005 | Huh et al. |
| 2005/0197134 A1 | 9/2005 | McKenna et al. |
| 2005/0201474 A1 | 9/2005 | Cho et al. |
| 2005/0207374 A1 | 9/2005 | Petrovic et al. |
| 2005/0232158 A1 | 10/2005 | Hondo |
| 2005/0238027 A1 | 10/2005 | Skarpness et al. |
| 2005/0249141 A1 | 11/2005 | Lee et al. |
| 2005/0249222 A1 | 11/2005 | van Kampen et al. |
| 2005/0260997 A1 | 11/2005 | Korale et al. |
| 2005/0265301 A1 | 12/2005 | Heo et al. |
| 2005/0265353 A1 | 12/2005 | Sengupta et al. |
| 2005/0271025 A1 | 12/2005 | Guethaus et al. |
| 2005/0281212 A1 | 12/2005 | Jeong et al. |
| 2005/0281222 A1 | 12/2005 | Ranta-Aho et al. |
| 2005/0288026 A1 | 12/2005 | Byun et al. |
| 2006/0002367 A1 | 1/2006 | Lee et al. |
| 2006/0007886 A1 | 1/2006 | Lee et al. |
| 2006/0011953 A1 | 1/2006 | Nakahashi et al. |
| 2006/0025079 A1 | 2/2006 | Sutskover et al. |
| 2006/0030342 A1 | 2/2006 | Hwang et al. |
| 2006/0034175 A1 | 2/2006 | Herrmann |
| 2006/0045047 A1 | 3/2006 | Choi et al. |
| 2006/0050679 A1 | 3/2006 | Jiang |
| 2006/0050739 A1 | 3/2006 | Narad et al. |
| 2006/0056347 A1 | 3/2006 | Kwak et al. |
| 2006/0059186 A1 | 3/2006 | Backlund |
| 2006/0062196 A1 | 3/2006 | Cai et al. |
| 2006/0062312 A1 | 3/2006 | Lee et al. |
| 2006/0072494 A1 | 4/2006 | Matusz |
| 2006/0077892 A1 | 4/2006 | Jiang |
| 2006/0083183 A1 | 4/2006 | Teague et al. |
| 2006/0088009 A1 | 4/2006 | Gibbs et al. |
| 2006/0095567 A1 | 5/2006 | Biran et al. |
| 2006/0120403 A1 | 6/2006 | Murata et al. |
| 2006/0126541 A1 | 6/2006 | Park |
| 2006/0133422 A1 | 6/2006 | Maughan et al. |
| 2006/0143300 A1 | 6/2006 | See et al. |
| 2006/0146745 A1 | 7/2006 | Cai et al. |
| 2006/0153232 A1 | 7/2006 | Shvodian |
| 2006/0154680 A1 | 7/2006 | Kroth et al. |
| 2006/0156370 A1 | 7/2006 | Parantainen |
| 2006/0159102 A1 | 7/2006 | Major |
| 2006/0168343 A1 | 7/2006 | Ma et al. |
| 2006/0193282 A1 | 8/2006 | Ikawa et al. |
| 2006/0256818 A1 | 11/2006 | Shvodian et al. |
| 2006/0292982 A1 | 12/2006 | Ye et al. |
| 2007/0081483 A1 | 4/2007 | Jang et al. |
| 2007/0081513 A1 | 4/2007 | Torsner |
| 2007/0098006 A1 | 5/2007 | Parry et al. |
| 2007/0098115 A1 | 5/2007 | Bachl et al. |
| 2007/0099619 A1 | 5/2007 | Parekh et al. |
| 2007/0104151 A1 | 5/2007 | Papasakellariou et al. |
| 2007/0117579 A1 | 5/2007 | Cai et al. |
| 2007/0135080 A1 | 6/2007 | Islam et al. |
| 2007/0140115 A1 | 6/2007 | Bienas et al. |
| 2007/0147326 A1 | 6/2007 | Chen et al. |
| 2007/0149206 A1 | 6/2007 | Wang et al. |
| 2007/0206531 A1 | 9/2007 | Pajukoski et al. |
| 2007/0218930 A1 | 9/2007 | Kuo |
| 2007/0254595 A1 | 11/2007 | Yoon et al. |
| 2007/0254662 A1 | 11/2007 | Khan et al. |
| 2007/0274253 A1 | 11/2007 | Zhang et al. |
| 2008/0031253 A1 | 2/2008 | Kim et al. |
| 2008/0069031 A1 | 3/2008 | Zhang et al. |
| 2008/0095105 A1 | 4/2008 | Sundberg et al. |
| 2008/0130643 A1 | 6/2008 | Jain et al. |
| 2008/0137564 A1 | 6/2008 | Herrmann |
| 2008/0212541 A1 | 9/2008 | Vayanos et al. |
| 2008/0232291 A1 | 9/2008 | Hus et al. |
| 2008/0267136 A1 | 10/2008 | Baker et al. |
| 2008/0285501 A1 | 11/2008 | Zhang et al. |
| 2009/0052388 A1 | 2/2009 | Kim et al. |
| 2009/0109912 A1 | 4/2009 | DiGirolamo et al. |
| 2009/0129330 A1 | 5/2009 | Kim et al. |
| 2009/0156194 A1 | 6/2009 | Meylan |
| 2009/0163211 A1 | 6/2009 | Kitazoe et al. |
| 2009/0175241 A1 | 7/2009 | Ohta et al. |
| 2009/0175253 A1 | 7/2009 | Wu et al. |
| 2009/0201948 A1 | 8/2009 | Patwardhan et al. |
| 2009/0238141 A1 | 9/2009 | Damnjanovic et al. |
| 2009/0319850 A1 | 12/2009 | Baek et al. |
| 2009/0323624 A1 | 12/2009 | Kim |
| 2010/0014430 A1 | 1/2010 | Oka |
| 2010/0034095 A1 | 2/2010 | Ho et al. |
| 2010/0103899 A1 | 4/2010 | Kwak et al. |
| 2010/0105334 A1 | 4/2010 | Terry et al. |
| 2011/0032891 A1 | 2/2011 | Lee et al. |
| 2011/0038376 A1 | 2/2011 | Wiemann et al. |
| 2012/0163325 A1 | 6/2012 | Lee et al. |
| 2013/0242915 A1 | 9/2013 | Lee et al. |

FOREIGN PATENT DOCUMENTS

| | | |
|---|---|---|
| CN | 1346191 | 4/2002 |
| CN | 1383626 | 12/2002 |
| CN | 1411668 | 4/2003 |
| CN | 1430359 | 7/2003 |
| CN | 1476267 | 2/2004 |
| CN | 1565140 | 1/2005 |
| CN | 1649285 | 8/2005 |
| CN | 1663158 | 8/2005 |
| CN | 1692661 | 11/2005 |
| DE | 10337828 | 4/2005 |
| EP | 1009184 | 6/2000 |

(56) References Cited

FOREIGN PATENT DOCUMENTS

| | | |
|---|---|---|
| EP | 1041850 | 10/2000 |
| EP | 1261222 | 11/2002 |
| EP | 1361514 | 11/2003 |
| EP | 1392074 | 2/2004 |
| EP | 1441473 | 7/2004 |
| EP | 1478203 | 11/2004 |
| EP | 1496639 | 1/2005 |
| EP | 1545040 | 6/2005 |
| EP | 1557968 | 7/2005 |
| EP | 1599063 | 11/2005 |
| EP | 1605724 | 12/2005 |
| EP | 1684538 | 7/2006 |
| EP | 1757135 | 2/2007 |
| JP | 6-013959 | 1/1994 |
| JP | 06-121001 | 4/1994 |
| JP | 9-055693 | 2/1997 |
| JP | 1997-186704 | 7/1997 |
| JP | 9-327072 | 12/1997 |
| JP | 11-308671 | 11/1999 |
| JP | 2000-032088 | 1/2000 |
| JP | 2000-069555 | 3/2000 |
| JP | 2000-151494 | 5/2000 |
| JP | 2000-175271 | 6/2000 |
| JP | 2000-184428 | 6/2000 |
| JP | 2001-95031 | 4/2001 |
| JP | 2001-298770 | 10/2001 |
| JP | 2002064589 | 2/2002 |
| JP | 2002-374321 | 12/2002 |
| JP | 2003-008635 | 1/2003 |
| JP | 2003078480 | 3/2003 |
| JP | 2003-116172 | 4/2003 |
| JP | 2003174470 | 6/2003 |
| JP | 2003333661 | 11/2003 |
| JP | 2004-128967 | 4/2004 |
| JP | 2004-320165 | 11/2004 |
| JP | 2004312771 | 11/2004 |
| JP | 2004-349884 | 12/2004 |
| JP | 2005-517369 | 6/2005 |
| JP | 2005217743 | 8/2005 |
| JP | 2005-236988 | 9/2005 |
| JP | 2005-237013 | 9/2005 |
| JP | 2005-244958 | 9/2005 |
| JP | 2005278167 | 10/2005 |
| JP | 2005-536168 | 11/2005 |
| JP | 2005-539462 | 12/2005 |
| JP | 2006-14372 | 1/2006 |
| JP | 2006-020044 | 1/2006 |
| JP | 2006025437 | 1/2006 |
| JP | 2006-505998 | 2/2006 |
| JP | 2006352705 | 12/2006 |
| JP | 2009-284532 | 12/2009 |
| KR | 1020010111634 | 12/2001 |
| KR | 1020010111637 | 12/2001 |
| KR | 1020040048675 | 6/2004 |
| KR | 1020040064867 | 7/2004 |
| KR | 1020040089937 | 10/2004 |
| KR | 1020050029395 | 3/2005 |
| RU | 2168278 | 5/2001 |
| RU | 2191479 | 10/2002 |
| RU | 2232469 | 7/2004 |
| RU | 2232477 | 7/2004 |
| RU | 2237380 | 9/2004 |
| RU | 2263415 | 10/2005 |
| RU | 2270526 | 2/2006 |
| RU | 2009106289 | 8/2010 |
| TW | 407407 | 10/2000 |
| TW | 548916 | 8/2003 |
| TW | 552815 | 9/2003 |
| TW | 576027 | 2/2004 |
| TW | 586283 | 5/2004 |
| TW | 589818 | 6/2004 |
| TW | 590340 | 6/2004 |
| TW | 592412 | 6/2004 |
| TW | I228008 | 2/2005 |
| TW | I229268 | 3/2005 |
| TW | I229514 | 3/2005 |
| TW | 200522579 | 7/2005 |
| TW | I237478 | 8/2005 |
| TW | I239731 | 9/2005 |
| TW | I239756 | 9/2005 |
| TW | 200536318 | 11/2005 |
| TW | I242951 | 11/2005 |
| TW | 200541258 | 12/2005 |
| TW | M283441 | 12/2005 |
| TW | 200601727 | 1/2006 |
| TW | 200605549 | 2/2006 |
| TW | I253824 | 4/2006 |
| WO | 9409597 | 4/1994 |
| WO | 98/47302 | 10/1998 |
| WO | 98/49857 | 11/1998 |
| WO | 9944383 | 9/1999 |
| WO | 9960729 | 11/1999 |
| WO | 9963713 | 12/1999 |
| WO | 01/05068 | 1/2001 |
| WO | 01/05121 | 1/2001 |
| WO | 01/35586 | 5/2001 |
| WO | 0203720 | 1/2002 |
| WO | 02/39697 | 5/2002 |
| WO | 02/43403 | 5/2002 |
| WO | 0239760 | 5/2002 |
| WO | 0247417 | 6/2002 |
| WO | 02075442 | 9/2002 |
| WO | 02102110 | 12/2002 |
| WO | 03007636 | 1/2003 |
| WO | 03017691 | 2/2003 |
| WO | 03043259 | 5/2003 |
| WO | 03/047155 | 6/2003 |
| WO | 03/055142 | 7/2003 |
| WO | 03056723 | 7/2003 |
| WO | 03/087978 | 10/2003 |
| WO | 03096571 | 11/2003 |
| WO | 2004/030393 | 4/2004 |
| WO | 2004/034656 | 4/2004 |
| WO | 2004045234 | 5/2004 |
| WO | 2004075442 | 9/2004 |
| WO | 2004/091130 | 10/2004 |
| WO | 2004089030 | 10/2004 |
| WO | 2005/006660 | 1/2005 |
| WO | 2005/018269 | 2/2005 |
| WO | 2005/034418 | 4/2005 |
| WO | 2005/036917 | 4/2005 |
| WO | 2005055472 | 6/2005 |
| WO | 2005/071887 | 8/2005 |
| WO | 2005074312 | 8/2005 |
| WO | 2005088886 | 9/2005 |
| WO | 2005099125 | 10/2005 |
| WO | 2005/109695 | 11/2005 |
| WO | 2005/109837 | 11/2005 |
| WO | 2005/117317 | 12/2005 |
| WO | 2005114884 | 12/2005 |
| WO | 2005119941 | 12/2005 |
| WO | 2005125125 | 12/2005 |
| WO | 2006/012946 | 2/2006 |
| WO | 2007/095966 | 8/2007 |

OTHER PUBLICATIONS

U.S. Appl. No. 13/840,738, Office Action dated May 18, 2015, 9 pages.
European Patent Office Application Serial No. 13190899.8, Search Report dated Dec. 2, 2013, 7 pages.
Intellectual Property Office of India Application Serial No. 3868/KOLNP/2008, Office Action dated Aug. 18, 2014, 2 pages.
U.S. Appl. No. 12/159,849, Office Action dated Sep. 16, 2014, 8 pages.
U.S. Appl. No. 14/681,771, Office Action dated Jul. 1, 2015, 7 pages.
U.S. Appl. No. 12/159,849, Notice of Allowance dated Mar. 21, 2016, 4 pages.
U.S. Appl. No. 12/159,849, Office Action dated Nov. 23, 2015, 10 pages.
U.S. Appl. No. 14/109,801, Notice of Allowance dated Sep. 24, 2015, 8 pages.

(56) References Cited

OTHER PUBLICATIONS

U.S. Appl. No. 13/874,199, Office Action dated Oct. 26, 2015, 32 pages.
Taiwan Intellectual Property Office Application Serial No. 096104519, Office Action dated Apr. 17, 2013, 3 pages.
LG Electronics, "Initial access for LTE," TSG-RAN Working Group 2 #49, R2-052769, Nov. 2005, 2 pages.
U.S. Appl. No. 12/159,849, Office Action dated Apr. 10, 2015, 11 pages.
U.S. Appl. No. 14/483,940, Notice of Allowance dated Mar. 18, 2015, 6 pages.
China Mobile, "RRC States Analysis in LTE," 3GPP TSG RAN WG2#48, R2-052140, Aug. 29, 2005, 16 pages.
Panasonic, "E-UTRA Transport and Logical Channels," 3GPP TSG RAN WG2#49, R2-052860, Nov. 7, 2005, 4 pages.
Siemens, "States in E-UTRAN," 3GPP TSG-RAN WG RAN2#48, R2-052051, Aug. 29, 2005, 4 pages.
QUALCOMM Europe, "Signaling Optimization for E-UTRAN," 3GPP TSG-RAN WG2 Meeting #48-bis, R2-052407, Oct. 10, 2005, 8 pages.
Motorola et al., "MAC-e/es header and functional split," R2-042360, 3GPP TSG RAN WG2 Meeting#45, Nov. 2004, 2 pages.
Ericsson, "User plane protocol enhancements," R2-052749, TSG-RAN WG2 Meeting #48bis, Oct. 2005, 4 pages.
LG Electronics Inc., "MAC Enhancement," R2-060561, 3GPP TSG-RAN WG2 #51, Feb. 2006, 3 pages.
Qualcomm, "Need for MAC-hs segmentation mechanism," R2-020769, 3GPP TSG-RAN WG2 Meeting #28, Apr. 2002, 7 pages.
3rd Generation Partnership Project (3GPP), "LTE; Evolved Universal Terrestrial Radio Access (E-UTRA); Medium Access Control (MAC) Protocol Specification," (3GPP TS 36.321 v8A.0 Release 8), ETSI TS 136 321 V8A.0, Jan. 2009, 45 pages.
3rd Generation Partnership Project (3GPP), "Technical Specification Group Radio Access Network; Introduction of the Multimedia Broadcast Multicast Service (MBMS) in the Radio Access Network (RAN); Stage 2 (Release 6)," 3GPP TS 25.346 V6.7.0, Dec. 2005, 59 pages.
Ericsson, "Solution for sending NAS together with RRC connection request," R2-071817, 3GPP TSG-RAN WG2#58, May 2007, 8 pages.
LG Electronics Inc., "Default SRB for initial access," R2-061958, 3GPP TSG-RAN WG2 LTE Ad-hoc, Jun. 2006, 2 pages.
3rd Generation Partnership Project (3GPP), "Universal Mobile Telecommunications System (UMTS); Radio Resource Control (RRC) protocol specification (3GPP TS 25.331 version 6.8.0 Release 6)," ETSI TS 125 331, Dec. 2005, 1176 pages.
Derryberry, R.T. et al., "Reverse high-speed packet data physical layer enhancements in cdma2000 1xEV-DV", IEEE Communications Magazine, pp. 41-47, Apr. 2005.
Zdarsky, Frank A. et al., "Handover in Mobile Communication Networks: Who is in Control Anyway?", Proceedings of the 30th Euromicro Conference, Aug.-Sep. 2004, XP10723593, pp. 205-212.
Huawei: "Further Considerations on Multiplexing Method of Shared Control Channel in Uplink Single-Carrier FDMA", 3GPP TSG-RAN WG1 #43, R1-051430 [online], Nov. 7, 2005 (Nov. 7, 2005) [retrieved on Jul. 24, 2008 (Jul. 24, 2008)]. Retrieved from the Internet: <http://www.3gpp.org/ftp/TSG_RAN/WG1_RL1/TSGR1_43/Docs/R1-051430.zip> pp. 1-6.
Xu, H., et al.; "Performance Analysis on the Radio Link Control Protocol of UMTS System"; 2002 IEEE 56th Vehicular Technology Conference Proceedings; pp. 2026-2030; Sep. 2002.
Ericsson: "E_UTRA Random Access", TSG-RAN WG1 #43, R1-051445, Nov. 2005, 4 pages.
NTT Docomo, et al.: "Paging Channel Structure for E-UTRA Downlink", 3GPP TSG-RAN WG1 LTE Ad Hoc Meeting, R1-060034 [online], Jan. 23, 2006 [retrieved on Aug. 25, 2008]. Retrieved from the Internet: <http://www.3gpp1.org/ftp/tsg_ran/WG1_RL1/TSGR1_AH/LTE_AH_January-06/Docs/R1-060034.zip> pp. 1-5.
NTT Docomo et al.: "Multiplexing Method of Shared Control Channel in Uplink Single-Carrier FDMA Radio Access", 3GPP TSG-RAN WG1 #42bis, R1-051143 [online], Oct. 10, 2005 [retrieved on Jul. 24, 2008]. Retrieved from the Internet: <http://www.3gpp.org/ftp/tsg_ran/wg1_rl1/TSGR1_42bis/Docs/R1-051143.zip> pp. 1-8.
Motorola: "Paging Channel Design for E-UTRA", 3GPP TSG-RAN WG1 LTE Adhoc, R1-061712 [online], Jun. 27, 2006 [retrieved on Aug. 25, 2008]. Retrieved from the Internet: <http://www.3gpp1.org/ftp/tsg_ran/WG1_RL1/TSGR1_AH/LTE_AH_June-06/Docs/R1-061712.zip> pp. 1-3.
LG Electronics Inc.: "HARQ and ARQ Operation", 3GPP TSG-RAN WG2 #50, R2-060106, Jan. 9, 2006, 4 pages.
LG Electronics Inc.: "Framing in the MAC entity", 3GPP TSG-RAN WG2 #52, R2-061012, Mar. 27, 2006, 4 pages.
Sarkar, S. et al., "Common-Channel Soft Handoff in cdma2000—The Paging Channel", IEEE Transactions on Microwave Theory and Techniques, Jun. 2000, vol. 48, No. 6, pp. 938 to 950, XP011037998, ISSN 0018-9480. abstract, section IV.
Philips: "Evolved Paging Indicators for LTE", 3GPP TSG-RAN WG2 Meeting #49, R2-052985 [online], Nov. 2005 [retrieved on Aug. 25, 2008]. Retrieved from the Internet: <http://www.3gpp.org/FTP/tsg_ran/WG2_RL2/TSGR2_49/Documents/R2-052985.zip> pp. 1, 2.
Chung, J. et al., "Packet synchronization and identification for incremental redundancy transmission in FH-CDMA systems", Personal, Indoor and Mobile Radio Communications, Third IEEE International Symposium, Oct. 1992, p. 292.
U.S. Appl. No. 12/159,849, Final Office Action dated Jan. 13, 2015, 11 pages.
3rd Generation Partnership Project (3GPP), "Technical Specification Group Radio Access Network; Physical channels and mapping of transport channels onto physical channels (FDD) (Release 5)," 3GPP TS 25.211 V5.8.0, Dec. 2005, 39 pages.
The State Intellectual Property Office of the People's Republic of China Application Serial No. 201210049981.X, Office Action dated Nov. 4, 2014, 5 pages.
State Intellectual Property Office of the People's Republic of China Application Serial No. 201110399482.9, Office Action dated Aug. 21, 2013, 6 pages.
U.S. Appl. No. 12/159,849, Final Office Action dated Jul. 24, 2015, 10 pages.

METHOD FOR TRANSMITTING RESPONSE INFORMATION IN MOBILE COMMUNICATIONS SYSTEM

CROSS-REFERENCE TO RELATED APPLICATIONS

This application is a continuation of U.S. patent application Ser. No. 13/874,199, filed on Apr. 30, 2013, now U.S. Pat. No. 9,462,576, which is a continuation of U.S. patent application Ser. No. 13/410,214, filed on Mar. 1, 2012, now U.S. Pat. No. 8,451,821, which is a continuation of U.S. patent application Ser. No. 12/903,127, filed on Oct. 12, 2010, now U.S. Pat. No. 8,223,713, which is a continuation of U.S. patent application Ser. No. 12/278,566, filed on Dec. 1, 2008, now U.S. Pat. No. 7,843,877, which is the National Stage filing under 35 U.S.C. 371 of International Application No. PCT/KR2007/000654, filed on Feb. 7, 2007, which claims the benefit of earlier filing date and right of priority to Korean Application No. 10-2006-0107105, filed on Nov. 1, 2006, and also claims the benefit of U.S. Provisional Application Nos. 60/771,305, filed on Feb. 7, 2006, and 60/815,722, filed on Jun. 21, 2006, the contents of which are all hereby incorporated by reference herein in their entirety.

TECHNICAL FIELD

The present invention is directed to a mobile communication system, and, specifically to a method for transmitting response information in a mobile communication system.

BACKGROUND ART

FIG. 1 is a structural diagram illustrating a Long Term Evolution (LTE) system which is a mobile communication system. The LTE system is an evolved version of a conventional UMTS system and has been standardized by the 3GPP (3rd Generation Partnership Project).

The LTE network may be generally classified into an Evolved UMTS Terrestrial Radio Access Network (E-UTRAN) and a Core Network (CN). The E-UTRAN includes at least one eNode-B serving as a base station and an Access Gateway (AG) located at the end of the network so that it is connected to an external network.

The AG may be classified into a portion for processing user traffic and a portion for processing control traffic. The AG portion for processing user traffic and the AG portion for processing control traffic may be connected to each other via a new interface for communication. One or more cells may exist in an eNode-B. The eNode-Bs may be connected by an interface for the transmission of user traffic or control traffic.

The CN includes the AG and a node for registering a user of the user equipment (UE). An interface may also be provided in the E-UMTS in order to classify the E-UTRAN and the CN.

Radio interface protocol layers may be classified into the first layer (L1), the second layer (L2), and the third layer (L3) on the basis of three lower layers of an Open System Interconnection (OSI) reference model that is well known in the art. A physical layer of the first layer (L1) provides an information transfer service over a physical channel. A radio resource control (RRC) layer located at the third layer (L3) controls radio resources between the UE and the network.

The RRC layer exchanges RRC messages between the UE and the network for this purpose. The RRC layer may be distributed to a plurality of network nodes, such as eNode-B and AG, and may also be located at the eNode-B or the AG.

FIG. 2 is a conceptual diagram illustrating a control plane of a radio interface protocol structure between the UE and the UTRAN (UMTS Terrestrial Radio Access Network) based on the 3GPP radio access network standard. The radio interface protocol is horizontally represented by a physical layer, a data link layer and a network layer. The radio interface protocol is vertically represented by a user plane for transmitting data and the control plane for transmitting control signals.

The protocol layers of FIG. 2 may be classified into a physical layer, a Medium Access Control (MAC) layer, a Radio Link Control (RLC) layer and a Radio Resource Control (RRC) layer.

The physical layer, which is a first layer, provides an information transfer service to an upper layer over a physical channel. The physical layer is connected to a Medium Access Control (MAC) layer located there above via a transport channel.

The MAC layer communicates with the physical layer over the transport channel such that data is communicated between the MAC layer and the physical layer. Data is communicated among different physical layers, such as between a first physical layer of a transmission side and a second physical layer of a reception side.

The MAC layer of the second layer (L2) transmits a variety of services to the RLC (Radio Link Control) layer, which is its upper layer, over a logical channel. The RLC layer of the second layer (L2) supports reliable data transmission.

It should be noted that the RLC layer is depicted in dotted lines, because if the RLC functions are implemented in and performed by the MAC layer, the RLC layer itself may not need to exist.

The RRC (Radio Resource Control) layer located at the lowest portion of the third layer (L3) is defined by only the control plane. The RRC layer controls logical channels, transport channels and physical channels for the configuration, reconfiguration and release of Radio Bearers (RBs). An RB denotes a service provided by the second layer (L2) for data transfer between the UE and the E-UTRAN.

FIG. 3 is a conceptual diagram illustrating a user plane of a radio interface protocol structure between the UE and the UTRAN according to the 3GPP radio access network standard. The radio protocol user plane classifies into a physical layer, a MAC layer, a RLC layer and a PDCP (Packet Data Convergence Protocol) layer.

The physical layer of the first layer (L1) and the MAC and RLC layers of the second layer (L2) is used to effectively transmit data using an IP packet, such as IPv4 or IPv6, on a radio interface with a relatively narrow bandwidth. The PDCP layer performs header compression to reduce the size of a relatively-large IP packet header containing unnecessary control information.

Uplink and downlink channels for transmitting data between the network and the UE will hereinafter be described in detail. Downlink channels transmit data from the network to the UE. Uplink channels transmit data from the UE to the network.

Examples of downlink channels are a Broadcast Channel (BCH) for transmitting system information and a downlink Shared Channel (SCH) and a Shared Control Channel (SCCH) for transmitting user traffic or control messages. The use traffic or control messages of a downlink multicast service or broadcast service may be transmitted over the downlink shared channel (SCH) or may be transmitted over an additional multicast channel (MCH).

Examples of uplink channels are a Random Access Channel (RACH) and an uplink shared channel (SCH) and a shared control channel (SCCH) for transmitting user traffic or control messages.

FIG. 4 is a conceptual diagram illustrating a hybrid automatic repeat and request (HARQ) scheme. A method for implementing HARQ in the downlink physical layer of a radio packet communication system will be described with reference to FIG. 4.

Referring to FIG. 4, the eNode-B determines a UE that is to receive packets and the type of packet that is to be transmitted to the UE, such as a code rate, a modulation scheme and an amount of data. The eNode-B informs the UE of the determined information over a High-Speed Downlink Shared Control Channel (HS-SCCH) and transmits a corresponding data packet via High-Speed Downlink Shared Channel (HS-DSCH) at a time associated with the transmission of the information over the HS-SCCH.

The UE receives the downlink control channel, identifies a packet type to be transmitted and a transmission time point, and receives the corresponding packet. The UE then attempts to decode the received packet data.

The UE transmits a negative acknowledgement (NACK) signal to the eNode-B if the UE fails to decode a specific packet, such as data1. The eNode-B recognizes that packet transmission has failed and re-transmits the same data, such as data1, using the same packet format or a new packet format at a suitable time point. The UE combines the re-transmitted packet, such as data1, and a previously received packet for which packet decoding failed and re-attempts packet decoding.

The UE transmits an acknowledgement (ACK) signal to the eNode-B if the packet is received and decoded successfully. The eNode-B recognizes successful packet transmission and performs transmission of the next packet, such as data2.

A random access channel (RACH) indicates a channel for transmitting an initial control message from the UE to the network. The RACH is adapted to implement synchronization between the UE and the network. Furthermore, if there is no more data for transmission left in a UE that desires to transmit data in an uplink direction, the UE can acquire necessary radio resources over the RACH.

For example, when the UE is powered on it attempts to access a new cell. The UE performs downlink synchronization and receives system information from a target cell desired by the UE.

Upon receiving the system information, the UE must transmit an access request message to access the RRC layer. However, the UE is not synchronized with a current network and there is no guarantee of uplink radio resources since it uses the RACH.

In other words, the UE requests radio resources capable of transmitting the access request message to the network. If the eNode-B receives the radio-resource request signal from the UE, it allocates suitable radio resources to the UE to transmit a RRC connection request message. The UE can then transmit the RRC connection request message to the network using the allocated radio resources.

In another example, it is assumed that an RRC connection is established between the UE and the network. The UE receives radio resources from the network according to the radio resource scheduling process of the network such that data from the UE is transmitted to the network using the radio resources.

However, if there is no more data for transmission left in a buffer of the UE, the network no longer allocates uplink radio resources to the UE. If the network allocates the uplink radio resources to the UE, this allocation is considered to be ineffective. The buffer state of the UE is periodically or accidentally reported to the network.

Therefore, if new data is stored in the buffer of the UE having no radio resources, the UE utilizes the RACH since there are no uplink radio resources allocated to the UE. In other words, the UE requests radio resources required for data transmission to the network.

RACH as used in a Wideband Code Division Multiple Access (WCDMA) system will hereinafter be described in detail. The RACH is used for transmission of data with short length. Some RRC messages, such as an RRC connection request message, a cell update message, and a URA update message, are transmitted over the RACH.

A plurality of logic channels can be mapped to the RACH. For example, a common control channel (CCCH), a dedicated control channel (DCCH), and a dedicated traffic channel (DTCH) may be mapped to the RACH. The RACH is mapped to a physical random access channel (PRACH).

FIG. 5 is a conceptual diagram illustrating an example of a PRACH (Physical Random Access Channel) transmission method. As illustrated in FIG. 5, the PRACH which is an uplink physical channel is divided into a preamble part and a message part.

The preamble part performs a power-ramping function for adjusting power required for transmitting a message and an anti-collision function for preventing transmissions from several UEs from colliding with each other. The message part performs transmission of a MAC Protocol Data Unit (MAC PDU) to the physical channel from the MAC layer.

If the MAC layer of the UE indicates the physical layer of the UE to transmit the PRACH transmission, the physical layer of the UE selects a single access slot and a single signature and transmits the PRACH preamble in the uplink. The preamble can be transmitted during an access slot period of 1.33 ms and selects a single signature from among 16 signatures during an initial predetermined period of the access slot such that it can transmit the selected signature.

When the UE transmits the preamble, the eNode-B can transmit a response signal over an acquisition indicator channel (AICH) which is a downlink physical channel. The eNode-B transmits a positive response (ACK) or negative response (NACK) to the UE using a response signal transmitted over the AICH.

If the UE receives an ACK response signal, it transmits the message part. If the UE receives a NACK response signal, the MAC layer of the UE indicates the physical layer of the UE to perform PRACH retransmission after a predetermined time. If the UE does not receive a response signal corresponding to the transmitted preamble, it transmits a new preamble at a power level that is higher than that of a previous preamble by one level after a designated access slot.

Although the above-mentioned description has disclosed a response signal to the RACH preamble, it should be noted that the eNode-B can transmit data or control signals to the UE. There are a variety of control signals transmitted from the eNode-B to the UE, such as downlink scheduling information, uplink scheduling grant information, and response information associated with the UE s RACH preamble transmission.

DISCLOSURE OF INVENTION

Technical Problem

According to the conventional art, when the UE transmits data over the RACH, it transmits the RACH preamble to the eNode-B and the eNode-B transmits response information associated with the RACH preamble to the UE. However, if at least two UEs transmit their RACH preambles in order to use the RACH at the same or similar time, the eNode-B must inform each of the two UEs regarding response information associated with the respective preambles, thereby requiring the allocation of radio resources for transmitting the response information to each UE and wasting radio resources.

Provided that the UE uses the HARQ scheme when transmitting data to the eNode-B using the radio resources allocated over the RACH, the eNode-B pre-allocates not only first radio resources associated with initial transmission data but also second radio resources associated with re-transmission data. Therefore, the second radio resources for the re-transmission data are unnecessarily wasted if the UE successfully transmits data at a first transmission time.

Technical Solution

An object of the present invention is to provide a method for transmitting response information in a mobile communication system that reduces an amount of wasted radio resources and effectively uses radio resources. Another object of the present invention is to provide a mobile communication system which does not transmit response information associated with UEs separately when two or more UEs have transmitted RACH preambles at the same or similar time, but rather transmits RACH preamble response information to a specific UE, configures the associated response information in the form of a single data unit over a common channel, and transmits the configured data unit to the specific UE.

In one aspect of the present invention, a method for transmitting a specific preamble and receiving information in response to the specific preamble in a mobile communication system is provided. The method includes transmitting the specific preamble over a random access channel (RACH), receiving response information over a common channel, the response information including at least one response and identification information corresponding to the at least one response, the at least one response corresponding to at least one preamble transmitted during a specific time interval and processing the at least one response if the identification information indicates that the at least one response corresponds to the specific preamble.

It is contemplated that the method further includes transmitting data using radio resources allocated in the at least one response if the identification information indicates that the at least one response corresponds to the specific preamble. It is further contemplated that the method further includes receiving a first message including an indication that the transmitted data was not properly received and retransmitting the data using newly allocated radio resources.

It is contemplated that the first message includes the newly allocated radio resources. It is further contemplated that the method further includes receiving a second message including the newly allocated radio resources. Preferably, the common channel is a downlink shared channel (DL-SCH).

In another aspect of the present invention, a method for transmitting a preamble and receiving information in response to the preamble in a mobile communication system is provided. The method includes receiving at least one preamble over a random access channel (RACH) during a specific time interval and transmitting response information over a common channel, the response information including a response corresponding to the at least one preamble received during the specific time interval and identification information identifying a mobile communication terminal from which the at least one preamble was received, It is contemplated that the method further includes allocating radio resources in the response, the radio resources associated with transmitting data from the mobile communication terminal from which the at least one preamble was received. It is further contemplated that the method further includes receiving data from the mobile communication terminal from which the at least one preamble was received, the data transmitted using the allocated radio resources, determining that the data was not properly received, transmitting a first message including additional allocated radio resources associated with retransmitting the data and receiving the data retransmitted using the radio resources allocated in the message.

It is contemplated that the method further includes including an indication in the first message that the data was not properly received. It is further contemplated that the method further includes transmitting a second message including an indication that the data was not properly received. Preferably, the common channel is a downlink shared channel (DL-SCH).

In another aspect of the present invention, a method for transmitting a specific preamble and receiving information in response to the specific preamble in a mobile communication system is provided. The method includes a specific mobile communication terminal transmitting the specific preamble over a random access channel (RACH), a network transmitting response information over a common channel, the response information including a response corresponding to at least one preamble received during a specific time interval and identification information identifying a mobile communication terminal from which the at least one preamble was received, the specific mobile communication terminal receiving the response information and the specific mobile communication terminal processing the at least one response if the identification information indicates that the at least one response corresponds to the specific preamble.

It is contemplated that the method further includes the network allocating radio resources in the response, the radio resources associated with transmitting data from the mobile communication terminal from which the at least one preamble was received. It is further contemplated that the method further includes the specific mobile communication terminal transmitting data using the radio resources allocated in the at least one response if the identification information indicates that the at least one response corresponds to the specific preamble.

It is contemplated that the method further includes the network receiving data from the mobile communication terminal from which the at least one preamble was received, the data transmitted using the allocated radio resources, the network determining that the data was not properly received, the network transmitting a first message including additional allocated radio resources associated with retransmitting the data, the specific mobile communication terminal retransmitting the data using the radio resources allocated in the first message and the network receiving the data re-transmitted using the radio resources allocated in the message. It is further contemplated that the method further includes the network including an indication in the first message that the data was not properly received.

It is contemplated that the method further includes the network transmitting a second message including an indication that the data was not properly received. It is further contemplated that the common channel is a downlink shared channel (DL-SCH).

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

A method for transmitting response information in a mobile communication system according to the present invention will hereinafter be described with reference to the accompanying drawings. For the convenience of description and better understanding of the present invention, the term "UE" will be used to indicate a transmission entity of an uplink signal and the term "eNode-B" will be used to indicate a reception entity of the uplink signal. However, it should be noted that the scope of the terminal and the base station is not limited to the above-mentioned terms and the term "UE" and the term "eNode-B" may also be used to indicate, respectively, a terminal and a base station.

Figure 1:
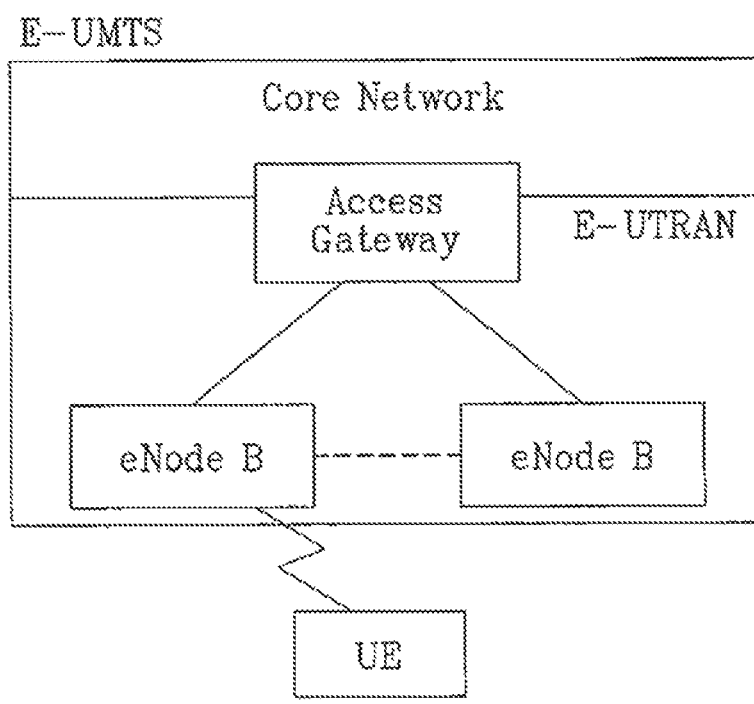
FIG. 1 is a structural diagram illustrating a Long Term Evolution (LTE) system which is a mobile communication system.
Figure 2:
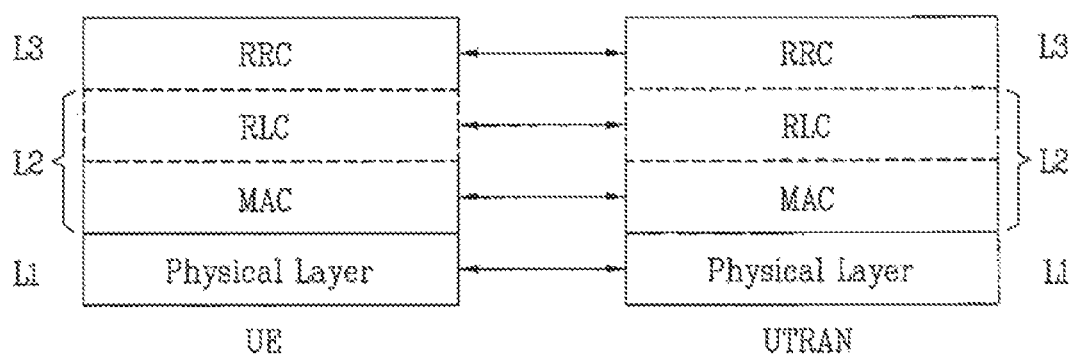
FIG. 2 is a conceptual diagram illustrating each layer of a control plane of radio interface protocols
Figure 3:
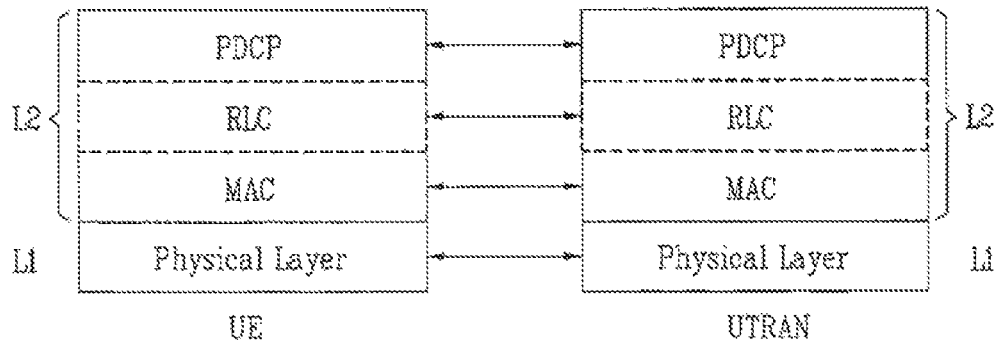
FIG. 3 is a conceptual diagram illustrating each layer of a user plane of radio interface protocols.
Figure 4:
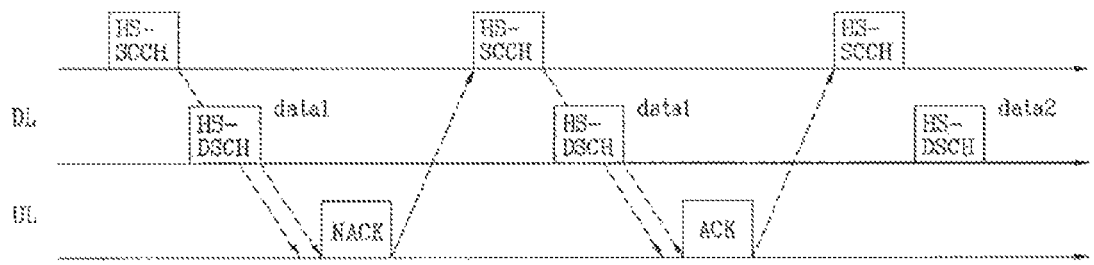
FIG. 4 is a conceptual diagram illustrating a hybrid ARQ (HARQ) scheme.
Figure 5:
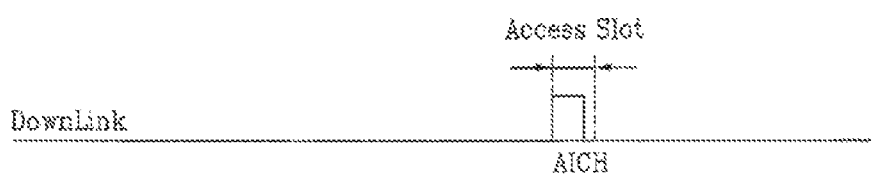
FIG. 5 is a conceptual diagram illustrating an example of a PRACH (Physical Random Access Channel) transmission method.
Figure 5:
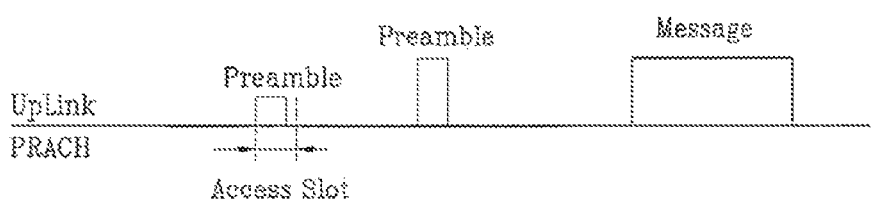
Figure 6:
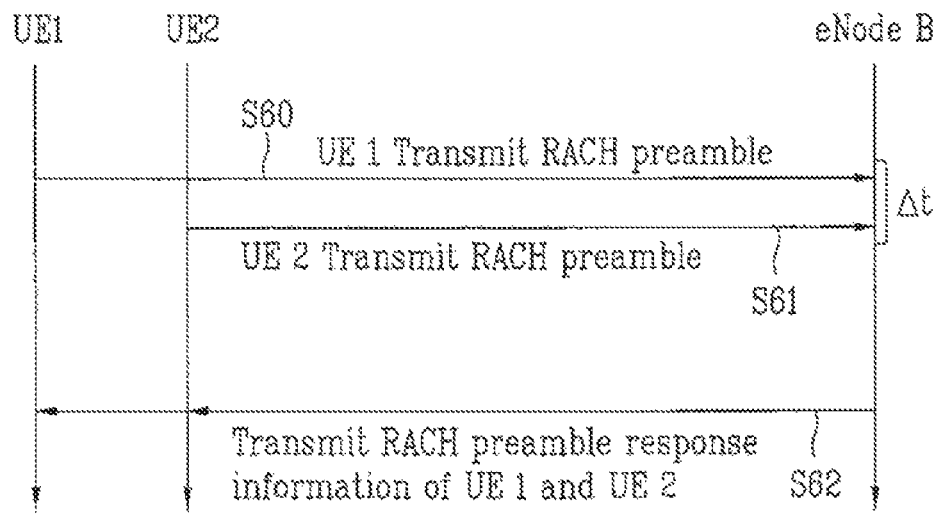
FIG. 6 is a flow chart illustrating a method for transmitting response information in a mobile communication system according to one embodiment of the present invention.

FIG. 6 is a flow chart illustrating a method for transmitting response information in a mobile communication system according to one embodiment of the present invention. A method for transmitting response information associated with preamble transmission of at least one UE at a time will hereinafter be described.

The UE uses the RACH to perform a RRC connection request, a cell update, a handover, an uplink radio resource request and maintenance of synchronization associated with the eNode-B. The UE transmits a preamble prior to the transmitting of data. The preamble uses for adjusting transmission power required for data transmission and for preventing several UEs from colliding with each other.

When using RACH, the UE transmits the RACH preamble to the eNode-B and the eNode-B transmits RACH preamble response information to the UE. The eNode-B does not independently transmit response information associated with other UEs, each of which transmits RACH preambles at the same or similar time, but rather transmits the response information associated with the other UEs over a common channel at the same time.

For example, if a first UE, a second UE, and a third UE transmit their RACH preambles to the eNode-B within a predetermined period of time, the eNode-B configures response information associated with the first through third UEs in the form of a single data unit and transmits the single data unit to the first through third UEs over a common channel in order to reply to the RACH preambles of the first through third UEs.

As illustrated in FIG. 6, the first UE (UE1) transmits its RACH preamble to the eNode-B at step S60 and the second UE (UE2) transmits its RACH preamble to the eNode-B at the same time or a similar time as the RACH preamble of the first UE is transmitted. In other words, the first UE (UE1) and the second UE (UE2) transmit their RACH preambles to the eNode-B at the same or similar time.

Therefore, the eNode-B receives at least one RACH preamble from at least two UEs during a predetermined time (
$\Delta t$
). Although FIG. 6 illustrates only the first (UE1) and second (UE2) UEs, it is obvious to those skilled in the art that the number of UEs may be N and the present invention may also be applied to N UEs.

The eNode-B receives RACH preambles of the first (UE1) and second (UE2) UEs and transmits response information of the received RACH preambles at step S62. The eNode-B transmits the response information over a common channel without allocating unique radio frequency RF channels to the first (UE1) and second (UE2) UEs in order to reply to the RACH preambles. The common channel allows all UEs within a cell to receive or read data from the eNode-B.

Figure 7:
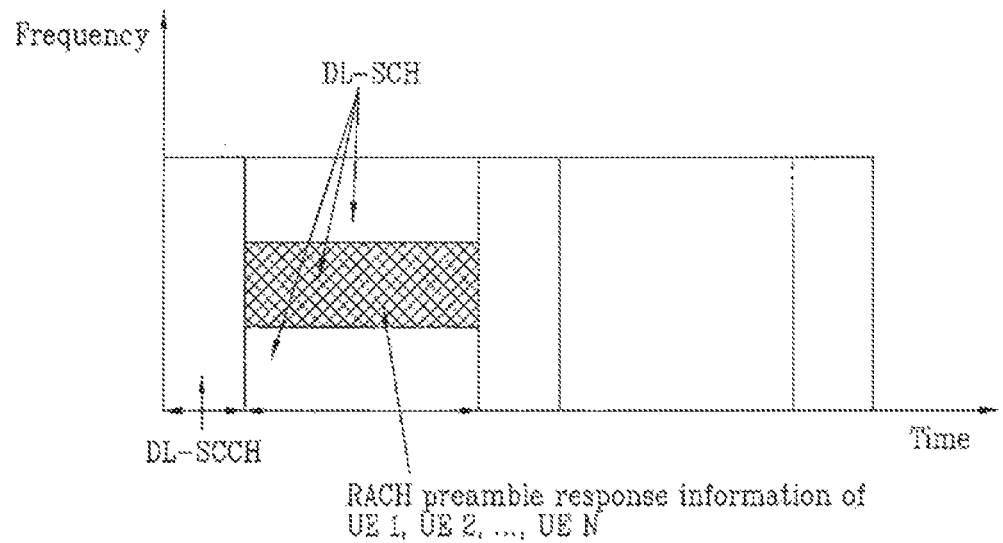
FIG. 7 is a conceptual diagram illustrating a method for transmitting response information to a UE over a common channel according to one embodiment of the present invention.

FIG. 7 is a conceptual diagram illustrating a method for transmitting response information to a UE over a downlink shared channel (DL-SCH) which is a common channel according to the one embodiment of the present invention. Generally, the DL-SCH is used to transmit data from the eNode-B to predetermined UEs or is used to transmit data to all UEs in a cell. Therefore, different UEs may receive data over the DL-SCH.

Although the eNode-B simultaneously transmits response information associated with a plurality of UEs over the DL-SCH, each UE can receive its response information from the eNode-B. The eNode-B transmits response information associated with the RACH preambles to the UEs over the DL-SCH. The single data unit of response information includes a plurality of response information associated with a plurality of UEs.

As illustrated in FIG. 7, the UE must first read the downlink shared control channel (DL-SCCH) in order to read data of the DL-SCH. The location information of the DL-SCH is transmitted over the DL-SCCH In other words, after transmitting the RACH preamble, the UE reads the DL-SCCH to receive response information from the eNode-B and then recognizes location information of the DL-SCH associated with the DL-SCCH. Control signals associated with the physical layer and/or the second layer are transmitted from the eNode-B to the UE over the DL-SCCH.

The DL-SCCH carries a variety of information, such as a UE ID (Identifier) for indicating which one of UEs will receive the data, location information related to frequency or time that indicates which DL-SCH data will be read by the UEs, specific information required by UEs that desire to read the DL-SCH data, and decoding information. In this way, it can be recognized which one of UEs will receive specific DL-SCH data by means of the UE ID included in DL-SCCH.

As illustrated in FIG. 6, the DL-SCH carries first response information for the first UE (UE1) and second response information for the second UE (UE2). In other words, the first UE (UE1) and the second UE (UE2) read the same DL-SCCH and determine the same DL-SCH location.

The first UE (UE1) and the second UE (UE2) read their unique response information over the same DL-SCH. The response information of the RACH preambles transmitted from the UEs at the same or similar time transmits to the UEs by multiplexing each response information for each UE at the second layer of the eNode-B.

The eNode-B configures the response information of the RACH preambles having been transmitted by the UEs at the same or similar time. The response information is configured in the form of a single MAC Protocol Data Unit (PDU).

A method for multiplexing the response information of the UEs to configure a single MAC PDU and transmitting the single MAC PDU will hereinafter be described with reference to Tables 1 and 2.

A representative example of a PDU configured by multiplexing of response information is shown in Table 1:

TABLE 1

| First UE' header | First UE' response information | Second UE' header | Second UE' response information | ... | N-thUE' header | N-th UE' response information |
| --- | --- | --- | --- | --- | --- | --- |

As illustrated in Table 1, the eNode-B configures a first UE' header prior to the first UE' response information. The header includes a UE ID indicating for which UE the response information is intended to read and also includes specific information indicating the length of the response information.

The eNode-B configures the first UE' response information after the first UE header. The response information for the first UE includes uplink radio resources allocated to the first UE, an identifier within a cell, a temporary identifier of the first UE, and a compensation value associated with synchronization with the eNode-B.

After configuring the first UE header and the first UE' response information, the eNode-B configures the second UE' header and the second UE' response information. In this way, the PDU generated by including response information of several UEs in single response information may be configured.

Another example of a single PDU configured by the multiplexing of response information is shown in Table 2.

As illustrated in Table 2, a header including the first UE' identifier and the length of response information is attached to the MAC PDU. The header serves the same function as that of the header illustrated in the Table 1.

TABLE 2

| First UE' header | Second UE' header | ... | N-thUE' header | Indicator header end | First UE' response information | Second UE' response information | ... | N-th UE' response information |
| --- | --- | --- | --- | --- | --- | --- | --- | --- |

The second UE' header is the attached to the PDU after the first UE' header. In this way, the PDU includes as many headers as the number (N) of UEs for which response information is to be included in single response information.

An indication indicating the end of the header is attached to the end of the header. The eNode-B can recognize the beginning of the response information using this header. Thereafter, the MAC PDU is formed by sequentially attaching response information of individual UEs.

The response information of each UE includes information of uplink radio resources allocated to the each UE, an identifier within a cell, a temporary identifier of the UE, and a compensation value associated with synchronization a with the eNode-B. Each UE recognizes its own response information from among a plurality of response information that have been multiplexed into the single response information and transmitted over the common channel. Each UE transmits data to the eNode-B using uplink radio resources allocated to the each UE in the response information associated with its RACH preamble.

Figure 8:
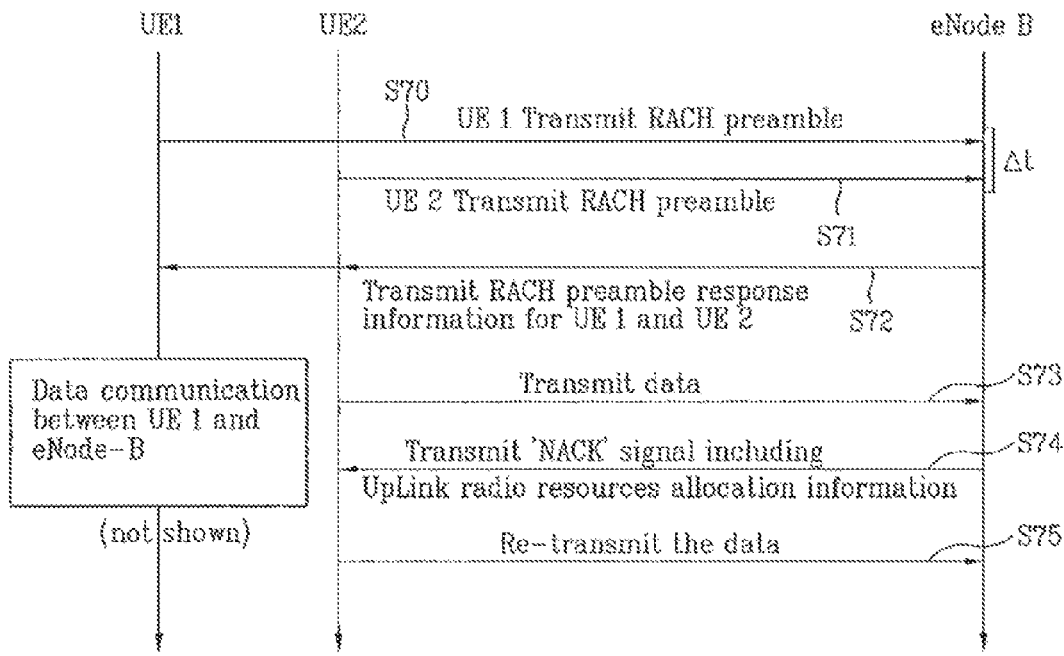
FIG. 8 is a flow chart illustrating a method for transmitting response information in a mobile communication system according to another embodiment of the present invention.

FIG. 8 is a flow chart illustrating a method for transmitting response information in a mobile communication system according to another embodiment of the present invention. Specifically, FIG. 8 illustrates a scheduling method for a specific case in which a HARQ (Hybrid ARQ) scheme is used when data is transmitted to the eNode-B.

As illustrated in FIG. 8, a first UE (UE1) transmits its RACH preamble to the eNode-B at step S70 and a second UE (UE2) transmits its RACH preamble to the eNode-B at step S71 in a manner similar to that illustrated in FIG. 6. The first UE (UE1) and second UE (UE2) receive response information configured in the form of a single data unit over a common channel, such as a DL-SCH, at step S72.

Each UE then transmits data to the eNode-B using uplink radio resources allocated to the each UE in the response information associated with each RACH preamble. It should be noted that FIG. 8 illustrates only a data transmission/reception process between the second UE (UE2) and the eNode-B after reception of the response information. It is obvious to those skilled in the art that the above-mentioned process can also be applied to the case of the first UE (UE1) in the same manner as for the second UE (UE2).

Provided that the HARQ scheme is used when each UE transmits data to the eNode-B using the uplink radio resources allocated over the RACH, uplink radio resources for data re-transmission are not pre-allocated but rather allocated and transmitted to each UE with a NACK signal when data re-transmission is required due to a decoding failure of the eNode-B. The uplink radio resources for data re-transmission may be included in the NACK signal. A specific control signal may be used to allocate the uplink radio resources for re-transmission to the UE.

As illustrated in FIG. 8, the second UE (UE2) transmits data to the eNode-B at step S73 after receiving the response information from the eNode-B. The second UE (UE2) employs a HARQ scheme when transmitting the above-mentioned data to the eNode-B. The eNode-B informs the UEs of the setup of the HARQ scheme through system information.

The eNode-B receives the data from the second UE (UE2) and decodes the received data. If the eNode-B does not decode the data correctly, it transmits a NACK signal to the second UE (UE2) to indicate a decoding error at step S74.

The eNode-B allocates radio resources required for data re-transmission to the second UE (UE2), and transmits information associated with the allocated radio resources along with the NACK signal at the same time. In other words, the uplink radio resource allocation information in the response information is related only to the first transmission of the HARQ when the eNode-B transmits response information of the RACH preamble to the UE.

For example, if the radio resources required for data transmission after the RACH preamble have a specific value of 100 and the data requires re-transmission due to the HARQ operation, the UE re-requires the radio resources of 100. If the data re-transmission is applied to a case in which the eNode-B allocates uplink radio resources according to the UE s RACH preamble, radio resources of 200 will be allocated to the UE.

However, when allocating radio resources as response information of the UE s RACH preamble, the eNode-B allocates only the 100 radio resources associated with the first transmission to the UE according to the present invention. Thereafter, if data re-transmission is required due to failure of a UE s data transmission, the eNode-B additionally allocates not only the NACK signal but also the 100 additional radio resources to the UE.

The specific control signal including the radio-resource allocation information required for data re-transmission may be transmitted according to the same format as that for the RACH preamble s response information. Also, a channel used when the eNode-B allocates radio resources to the UE may also be used as an example of the present invention.

The second UE (UE2) re-transmits the data at step S75 according to uplink radio resource allocation information that was transmitted with the NACK signal.

Figure 9:
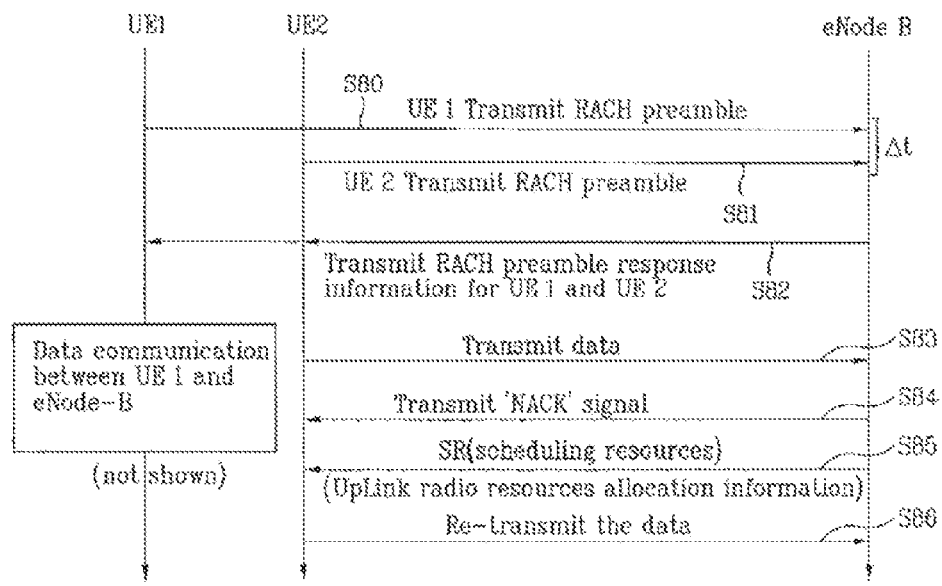
FIG. 9 is a flow chart illustrating a method for transmitting response information in a mobile communication system according to another embodiment of the present invention.

FIG. 9 is a flow chart illustrating a method for transmitting response information in a mobile communication system according to another embodiment of the present invention. Specifically, FIG. 9 illustrates a scheduling method for a specific case in which a HARQ (Hybrid ARQ) scheme is used when data is transmitted to the eNode-B. One of differences with the case of FIG. 8 is that uplink radio resources for data re-transmission may not be included in the NACK signal but be transmitted separately with the NACK signal at the same or another time.

As illustrated in FIG. 9, a first UE (UE1) transmits its RACH preamble to the eNode-B at step S80 and a second UE (UE2) transmits its RACH preamble to the eNode-B at step S81 in a manner similar to that illustrated in FIG. 6 and FIG. 8. The first UE (UE1) and second UE (UE2) receive response information configured in the form of a single data unit over a common channel, such as a DL-SCH, at step S82.

Each UE then transmits data to the eNode-B by using uplink radio resources allocated to the each UE in the response information associated with each RACH preamble at the step S83. It should be also noted that FIG. 9 illustrates only a data transmission/reception process between the second UE (UE2) and the eNode-B after reception of the response information. It is obvious to those skilled in the art that the above-mentioned process can also be applied to the case of the first UE (UE1) in the same manner as for the second UE (UE2).

The second UE (UE2) employs a HARQ scheme when transmitting the above-mentioned data to the eNode-B. The eNode-B preferably informs the UEs of the setup of the HARQ scheme through system information.

Provided that the HARQ scheme is used when each UE transmits data to the eNode-B by using the uplink radio resources allocated over the RACH, uplink radio resources for data re-transmission are not pro-allocated but rather allocated and transmitted to each UE with a NACK signal when data re-transmission is required due to a decoding failure of the eNode-B. The NACK signal transmitted when data re-transmission is required due to a decoding failure of the eNode-B at the step S84. And the uplink radio resources for data re-transmission are allocated. Namely, the uplink radio resources for data re-transmission are not pre-allocated but rather allocated and transmitted to each UE when re-transmission is necessary. A specific control signal may be used to allocate the uplink radio resources for re-transmission to the UE. The specific control signal may be a signal for SR (Scheduling Resources) from the eNode-B at the step S85. The specific control signal may be also a signal for scheduling information or any other signals.

The specific control signal including the radio resource allocation information required for data re-transmission may be transmitted according to the same format as that for the RACH preamble a response information. Also, a channel used when the eNode-B allocates radio resources to the UE may also be used as an example of the present invention.

The second UE (UE2) re-transmits the data at step S86 according to uplink radio resource allocation information that was transmitted with the specific control signal for example, SR.

As described herein, the method for transmitting response information in a mobile communication system according to the present invention can more effectively use radio resources, thereby reducing the amount of wasted radio resources.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefor all changes and modifications that fall within the metes and bounds of the claims, or equivalence of such metes and bounds are intended to be embraced by the appended claims.

INDUSTRIAL APPLICABILITY

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for a user equipment (UE) to perform a random access in a mobile communication system, the method comprising:
    transmitting a random access preamble to a network;
    receiving a medium access control protocol data unit (MAC PDU) comprising random access responses and header parts from the network, each of the header parts corresponding to each of the random access responses; and
    processing the received MAC PDU comprising the random access responses and the header parts,
    wherein all of the header parts is in a first part of the MAC PDU and all of the random access responses is in a second part of the MAC PDU subsequent to the first part.

2. The method of claim 1, wherein the MAC PDU is received through a downlink shared channel other than a downlink control channel.

3. A method for a user equipment (UE) to perform a random access in a mobile communication system, the method comprising:
    transmitting a random access preamble to a network;
    receiving a message comprising multiple random access responses and multiple header parts through a downlink shared channel, each of the header parts corresponding to each of the random access responses, all of the header parts being located before the all of the random access responses within the message; and
    processing the received message.

4. The method of claim 3, further comprising:
    receiving location information of the message through a downlink control channel.

5. A method for a network for a random access in a mobile communication system, the method comprising:
    receiving random access preambles from user equipments (UEs);
    transmitting a medium access control protocol data unit (MAC PDU) comprising random access responses and header parts from the network, each of the header parts corresponding to each of the random access responses; and
    wherein all of the header parts is in a first part of the MAC PDU and all of the random access responses is in a second part of the MAC PDU subsequent to the first part.

6. The method of claim 5, wherein the MAC PDU is transmitted through a downlink shared channel other than a downlink control channel.

7. A method for a network for a random access in a mobile communication system, the method comprising:
    receiving random access preambles from a user equipments (UEs);
    transmitting a message comprising multiple random access responses and multiple header parts through a downlink shared channel,
    wherein all of the header parts are located before the all of the random access responses, and
    wherein each of the header parts corresponds to each of the random access responses.

8. The method of claim 7, further comprising:
    transmitting location information of the message through a downlink control channel.

9. A user equipment (UE) performing a random access in a mobile communication system, the UE comprising:
    a transceiver configured to transmit a random access preamble to a network, and receive a medium access control protocol data unit (MAC PDU) comprising random access responses and header parts from the network, each of the header parts corresponding to each of the random access responses; and
    a processor configured to process the received MAC PDU comprising the random access responses and the header parts,
    wherein all of the header parts is in a first part of the MAC PDU and all of the random access responses is in a second part of the MAC PDU subsequent to the first part.

10. The UE of claim 9, wherein the transceiver receives the MAC PDU through a downlink shared channel other than a downlink control channel.

11. A user equipment (UE) performing a random access in a mobile communication system, the UE comprising:
    a transceiver configured to transmit a random access preamble to a network, and receive a message comprising multiple random access responses and multiple header parts through a downlink shared channel, each of the header parts corresponding to each of the random access responses, all of the header parts being located before the all of the random access responses within the message; and
    a processor configured to process the received message.

12. The UE of claim 11, wherein the transceiver receives location information of the message through a downlink control channel.

13. A network device for a random access in a mobile communication system, the device comprising:
    a transceiver configured to receive random access preambles from user equipments (UEs), and transmit a medium access control protocol data unit (MAC PDU) comprising random access responses and header parts from the network, each of the header parts corresponding to each of the random access responses; and
    a processor configured to prepare the MAC PDU,
    wherein all of the header parts is in a first part of the MAC PDU and all of the random access responses is in a second part of the MAC PDU subsequent to the first part.

14. The device of claim 13, wherein the transceiver transmits the MAC PDU through a downlink shared channel other than a downlink control channel.

15. A network device for a random access in a mobile communication system, the device comprising:
    a transceiver configured to receive random access preambles from a user equipments (UEs), and transmit a message comprising multiple random access responses and multiple header parts through a downlink shared channel; and a processor configured to prepare the message, wherein all of the header parts are located before the all of the random access responses, and wherein each of the header parts corresponds to each of the random access responses.

16. The device of claim 15, wherein the transceiver transmits location information of the message through a downlink control channel.

* * * * *